US012726377B2

(12) United States Patent
Betha et al.

(10) Patent No.: US 12,726,377 B2
(45) Date of Patent: Sep. 1, 2026

(54) ORIGINATING ROUTES IN A MULTICAST VIRTUAL PRIVATE NETWORK (MVPN) BASED ON TRAFFIC ACTIVITY

(71) Applicant: Arista Networks, Inc., Santa Clara, CA (US)

(72) Inventors: Sandeep Betha, Burnaby (CA); Prashant Srinivas, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/958,721

(22) Filed: Nov. 25, 2024

(65) Prior Publication Data

US 2026/0149616 A1 May 28, 2026

(51) Int. Cl.
*H04L 12/723* (2013.01)
*H04L 12/18* (2006.01)
*H04L 9/40* (2022.01)

(52) U.S. Cl.
CPC ........ *H04L 12/185* (2013.01); *H04L 12/1895* (2013.01); *H04L 63/0272* (2013.01)

(58) Field of Classification Search
None
See application file for complete search history.

(56) References Cited

U.S. PATENT DOCUMENTS 10,382,217 B1 * 8/2019 Kebler .................. H04L 12/185
2021/0014159 A1 * 1/2021 Mishra .................. H04L 45/741

FOREIGN PATENT DOCUMENTS

KR 20090116508 A * 11/2009 ......... G06Q 30/0277
WO WO-2018193285 A1 * 10/2018 ......... H04L 12/1886

* cited by examiner

*Primary Examiner* — Natisha D Cox
(74) *Attorney, Agent, or Firm* — Sprinkle IP Law Group

(57) ABSTRACT

Systems and methods for propagating information on sources for a multicast group across an MVPN from a co-located RP and PE in a site of the MVPN are disclosed. Embodiments may monitor traffic at a network device comprising the co-located RP and PE to determine when a source sends traffic for a multicast group. When it is determined that traffic for a multicast group is being sent from a source an advertising message for that source and multicast group may be sent to the MVPN.

20 Claims, 5 Drawing Sheets

FIG. 5
502
DETERMINE SOURCE AND MULTICAST GROUP DATA IN HARDWARE OF THE DEVICE
504
OBTAIN SOURCE GROUP HIT DATA
506
UPDATE SOURCE GROUP STATE DATABASE
508
NEW SOURCE FOR MULTICAST GROUP?
YES
NO
510
SEND TYPE 5 ADVISEMENT MESSAGE FOR SOURCE
512
SOURCE NO LONGER ACTIVE FOR MULTICAST GROUP?
YES
NO
514
SEND WITHDRAWAL FOR SOURCE

ORIGINATING ROUTES IN A MULTICAST VIRTUAL PRIVATE NETWORK (MVPN) BASED ON TRAFFIC ACTIVITY

BACKGROUND

A Multicast Virtual Private Network (MVPN) is a widely utilized solution for achieving scalable communication across distributed network environments. MVPNs provide a way to extend multicast capabilities across different sites seamlessly. Moreover, MVPNs may work within existing IP-based networks, allowing service providers to offer multicast services without overhauling their infrastructure.

Border Gateway Protocol (BGP) plays a critical role in these MVPN networks, especially in managing the distribution of multicast traffic across a service provider's infrastructure. BGP is used to exchange routing information between Provider Edge (PE) routers (or just PEs) in an MVPN. PE routers are crucial components in an MVPN that serves as the interface between a core network and each of the sites comprising the MVPN.

Protocol Independent Multicast (PIM) is another protocol used in MVPNs for managing such multicast traffic. PIM operates in both Sparse Mode (PIM-SM) and Source Specific Multicast Mode (PIM-SSM), accommodating different multicast group characteristics. PIM-SM may be utilized for scenarios where receivers are not aware of potential sources and PIM-SSM may be suitable in cases where the receivers are already aware of sources. PIM-SM may also be suitable for scenarios where receivers are sparsely distributed or other scenarios. In PIM-SM a Rendezvous Point (RP) is used to manage multicast traffic. These RPs are deployed at one or more locations (sites) in an MVPN network and act as a centralized point where multicast sources and receivers initially connect.

There are, however, certain deployments or configurations of PEs and RPs in an MVPN network that are problematic. In particular, in certain types of MVPN topologies, RPs at a site in the MVPN may be prevented from learning about sources active at another site in the MVPN.

It is thus desired to propagate information on an active source for a multicast group across MVPN sites in certain MVPN topologies.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
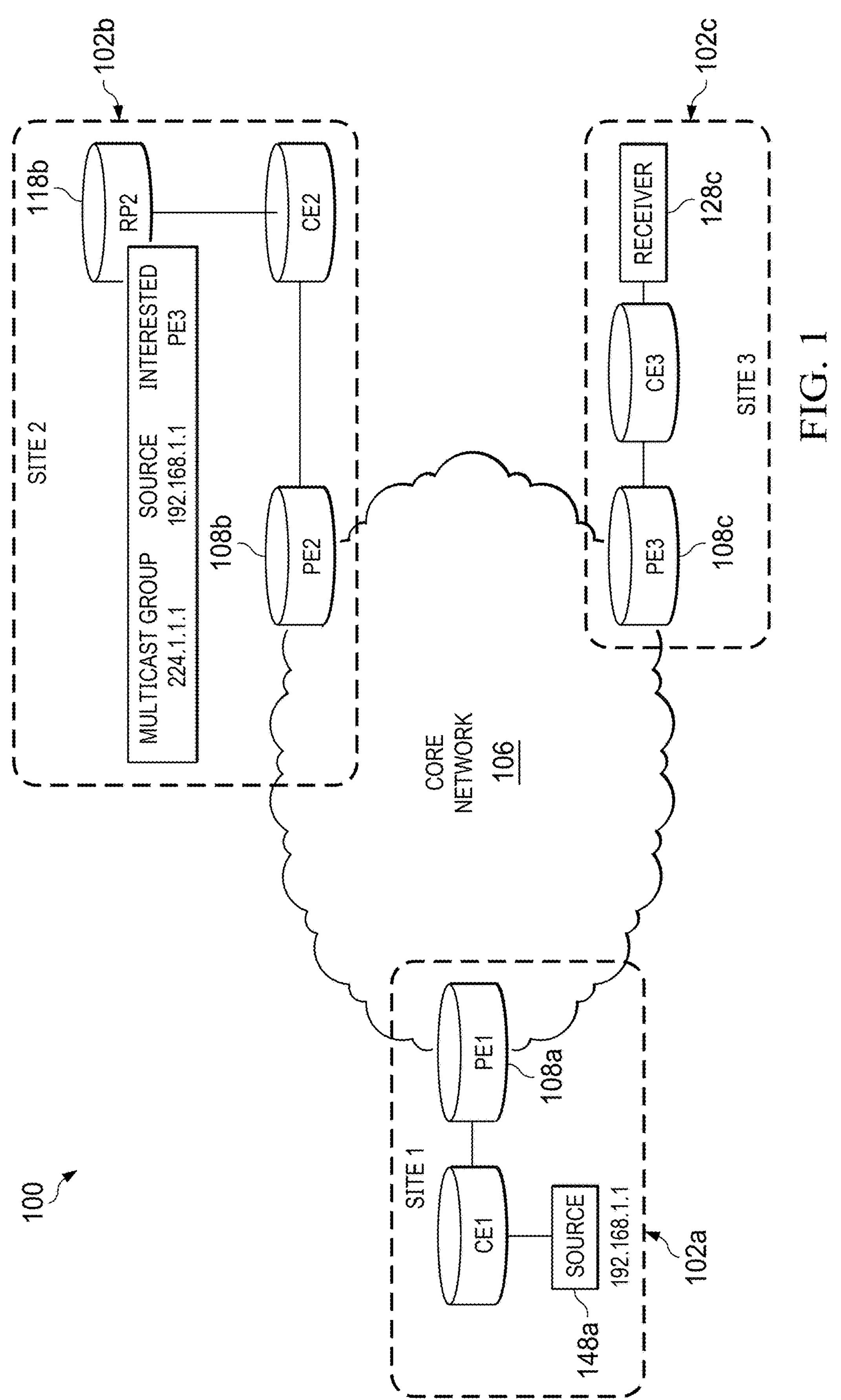
FIG. 1 is a block diagram depicting an architecture of an MVPN.

As discussed, modern enterprises increasingly rely on multiple data centers to ensure business continuity, disaster recovery, and optimal service delivery. A data center is usually a specialized facility that provides data serving and backup as well as other network-based services. Traditional approaches to interconnecting these data centers often encounter challenges in terms of scalability, flexibility, and ease of management. Moreover, ensuring secure and efficient communication between data centers while maintaining low-latency connectivity is crucial for the overall performance of distributed applications and services. Traditional networking solutions often face challenges in efficiently extending connectivity across multiple sites, particularly in the context of data centers or enterprise networks.

A Multicast Virtual Private Network (MVPN) is a widely utilized solution for achieving scalable communication across distributed network environments. Internet Engineering Task Force (IETF) RFCs 6513 and 6514 (incorporated herein by reference in their entirety) describe MVPN. MVPNs allow service providers to deliver multicast services (like video streaming, conferencing, etc.) over a Virtual Private Network (VPN) architecture by enabling the creation of VPNs that can handle multicast traffic, facilitating communication between multiple users without needing to send multiple copies of the same data.

MVPN was developed for a variety of reasons. One of the main reasons is the growing demand for multimedia services. As video and multimedia content become more prevalent, there is a need for efficient ways to deliver this content to multiple users simultaneously. Traditional unicast methods required sending individual streams to each user, which is bandwidth-intensive and inefficient. MVPNs scale better by sending a single stream that multiple users can receive. Moreover, MVPNs support multi-site connectivity, such that service providers (e.g., providers of multimedia content or other services) may utilize multiple sites deployed in different locations. MVPNs provide a way to extend multicast capabilities across those different sites seamlessly. Moreover, MVPNs may work within existing IP-based networks, allowing service providers to offer multicast services without overhauling their infrastructure.

Border Gateway Protocol (BGP) plays a critical role in these MVPN networks, especially in managing the distribution of multicast traffic across a service provider's infrastructure. BGP is used to exchange routing information between Provider Edge (PE) routers (or just PEs) in an MVPN. BGP is also utilized in the distribution of multicast routing information, ensuring that all PEs have the necessary knowledge of multicast group memberships. BGP supports the use of specific address families for multicast (e.g., multicast VPN address family), allowing PEs to exchange information about multicast group addresses and the associated forwarding information. BGP also plays a role in discovering multicast sources and receivers. BGP allows PEs to learn which routers are sources for specific multicast traffic and which routers are destinations that need to receive that traffic.

To illustrate in more detail, a PE router is a crucial component in an MVPN that serves as the interface between a (e.g., service provider's) core (or backbone) network and each of the (e.g., edge) network at each site. PEs facilitate the efficient routing and forwarding of multicast traffic between (e.g., edge) networks deployed at different sites and the core network. Their functions ensure that multicast services are delivered reliably and efficiently, meeting the needs of end-users and enhancing overall network performance. PEs manage multicast group memberships for the sites, learning which entities are interested in which multicast groups and they process join and leave messages from devices, updating the multicast forwarding state accordingly. In particular, PEs in an MVPN network may exchange information with other PEs in the network using BGP to distribute information about multicast group addresses and their associated sources. These messages may include, for example, a MVPN type 5 control plane messages, such as source active messages.

Protocol Independent Multicast (PIM) is another protocol used in MVPN networks for managing such multicast traffic. PIM facilitates the routing of multicast packets from sources to receivers across the network by assisting in determining the best paths for multicast traffic. PIM operates in both Sparse Mode (PIM-SM) and Source Specific Multicast Mode (PIM-SMM), accommodating different multicast group characteristics. PIM-SM may be utilized for scenarios where receivers are not aware of potential sources and PIM-SSM may be suitable in cases where the receivers are already aware of sources. PIM-SM may also be suitable for scenarios where receivers are sparsely distributed or other scenarios. In PIM-SM a Rendezvous Point (RP) is used to manage multicast traffic. These RPs are deployed at one or more locations (sites) in an MVPN network and act as a centralized point where multicast sources and receivers initially connect.

Sources that want to send multicast traffic for a multicast group thus first register with the RP. This process allows the RP to know which sources are available for specific multicast groups. The RP maintains information about which receivers are interested in particular multicast groups. PIM handles join and leave messages from multicast receivers. When a receiver wants to join a multicast group, it sends a message to the RP (or directly to the source in some cases), prompting the creation of the necessary multicast path.

Specifically, PIM may be used to establish multicast distribution trees. These trees may include shared trees (also referred to as a (*, G) tree) anchored at an RP through which traffic can flow from a multicast source to the receivers interested in traffic for that multicast group. The trees utilized in PIM-SM may also include source trees (also referred to as a (S, G) tree) to optimize traffic delivery directly from a multicast source to receivers for that multicast group traffic. When a receiver wants to join a multicast group, it sends a join request to the RP. The RP then establishes or updates a (*, G) for efficient multicast traffic distribution. The RP forwards multicast packets from sources (or routers associated with the source) to the receivers (or routers associated with the receiver) using the established shared tree. At some later point, these receivers can establish a (S, G) tree directly with the source for that multicast group.

There are, however, certain deployments or configurations of PEs and RPs in an MVPN network that are problematic. In particular, in these types of configurations, there may be multiple RPs deployed across different sites comprising an MVPN. Because of the configuration of these networks, RPs at one network site may be prevented from learning about sources active at another network site.

It may be useful here to illustrate these types of issues in more detail. Referring then to FIG. 1, one example of an MVPN 100 including sites 102*a*, 102*b*, and 102*c* (e.g., "customer" networks) is depicted. Each site 102 is connected over core network 106 through a respective PE 108. For example, site 102*a* is connected to other sites 102*b*, 102*c* in MVPN 100 over core network 106 through PE1 108*a*, site 102*b* is connected to other sites 102*a*, 102*c* in MVPN 100 over core network 106 through PE2 108*b* and site 102*c* is connected to other sites 102*a*, 102*b* in MVPN 100 over core network 106 through PE3 108*c*.

MVPN 100 includes a single RP 118*b* in site 102*b*. Suppose that a receiver 128*c* in site 3 102*c* wishes to receive traffic for a multicast group having an address of 224.1.1.1. Here, receiver 128*c* will send a request to join multicast group 224.1.1.1 (e.g., an Internet Group Management Protocol (IGMP) join message). As a result of this request to join multicast group 224.1.1, a (*, G) tree for multicast group 224.1.1.1 at PE3 108*c* in site 3 102*c* may be formed or updated, and a (*, G) join message for multicast group 224.1.1.1 may be sent by PE3 router 108*c* to the closest RP in MVPN network 100. In this case, the closest RP in network 100 is the single RP2 118*b* in site 102*b*. When RP2 118*b* receives this (*, G) join message, RP2 118*b* may register that PE3 108*c* is interested in traffic for multicast group 224.1.1.1.

When source 148*a* having address 192.168.1.1 in site 1 102*a* sends traffic for multicast group 224.1.1.1, this traffic will be received by router PE1 108*a* in site 1 102*a*. Router PE1 108*a* is aware of multicast group 224.1.1.1 and RP2 118*b* in site 2 102*b* and will send a registration message (e.g., a PIM registration message) to register as a source for multicast group 224.1.1.1. In response to this registration message, RP2 118*b* in site 102*b* registers source 148*a* (192.168.1.1) as a source of traffic for multicast group 224.1.1.1 PE1 108*a* may also send a MVPN type 5 source active control plane message to other PEs 108*b*, 108*c* in MVPN network 100 identifying source 148*a* as a source of traffic for multicast group 224.1.1.1. For example, PE1 108*a* will send type 5 only upon receiving a type 7 ((S, G) join equivalent) from an RP. An RP may send a type 7 message to a PE (e.g., PE1 108*a*) in order to receive the traffic on the (S, G) tree instead of receiving it as a register message. The source address may thus be known by looking at the register message.

Traffic for multicast group 224.1.1.1, thus initially flows from source 148*a*(192.168.1.1) in site 1 102*a* through router PE1 108*a* to RP2 118*b* in site 102*b*, which routes this traffic to all receivers registered at RP2 118*b* as interested in traffic for multicast group 224.1.1.1. Here, PE3 108*c* in site 102*c* is registered as an interested receiver, and traffic for multicast group 224.1.1.1 is eventually provided from RP2 118*b* to PE3 108*c* and to receiver 128*c* in site 102*c* using the (*, G) tree for multicast group 224.1.1.1 at PE3 108*c*. Once router PE1 108*a* associated with source 148*a* is determined (e.g., by PE3 108*c* from inspecting data plane traffic) an (S, G) tree may be formed (e.g., using a BGP type 7 message) between router PE1 108*a* and router PE3 108*c* (e.g., between source 148*a* and receiver 128*c*). PE3 108*a* may inform RP2 118*b* to stop sending traffic for multicast group 224.1.1.1 to PE3 108*c* after the (S, G) tree is formed.

As mentioned above, however, there are many common configurations of modern MVPN networks that prove problematic. In these types of configurations, there may be multiple RPs deployed across different sites comprising an MVPN. Moreover, these RPs may be deployed in association with PEs at those sites in such a manner that RPs at these network sites may be prevented from learning about sources active at another network site. It may be useful to illustrate such a scenario.

Figure 2:
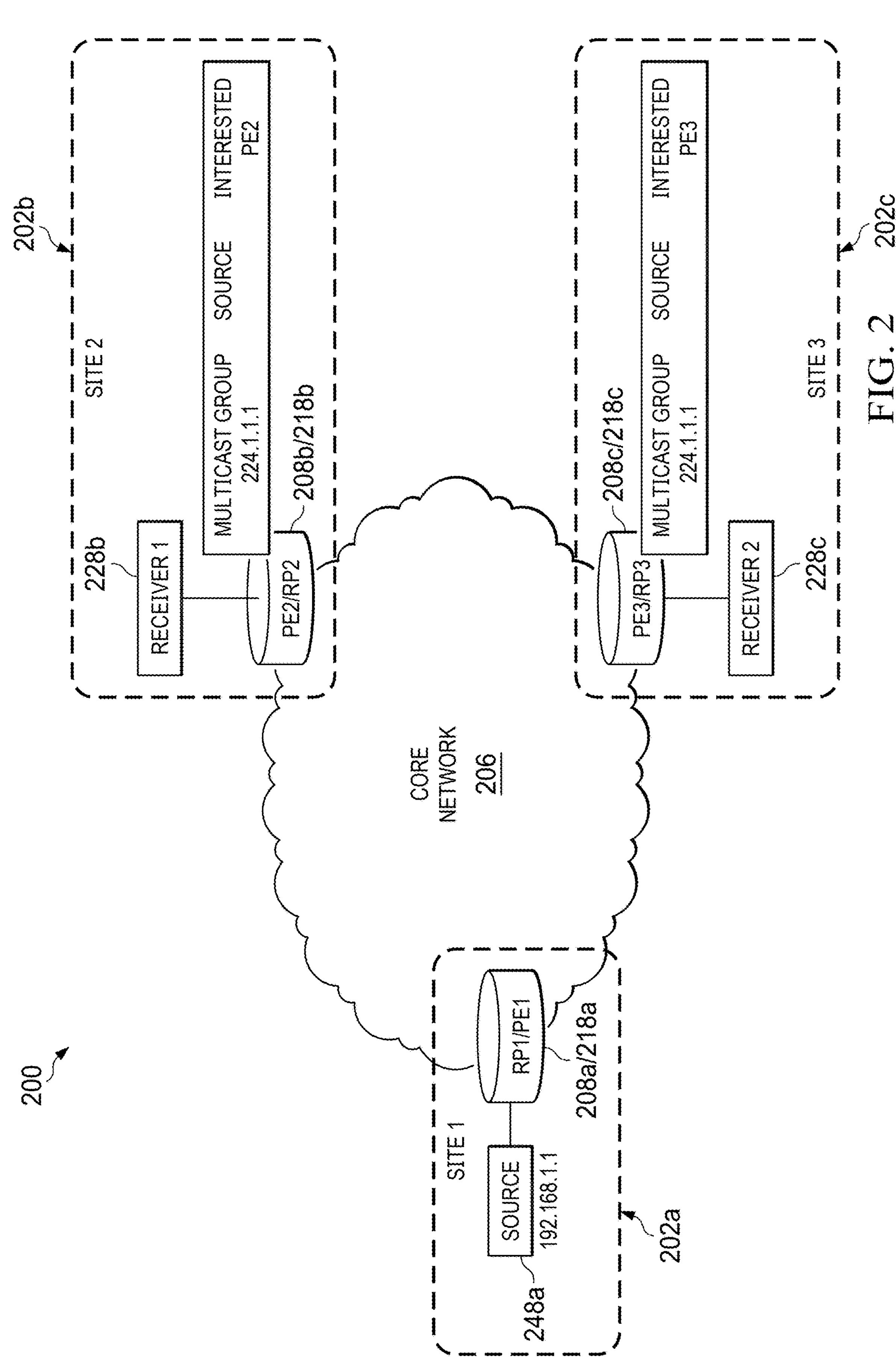
FIG. 2 is a block diagram depicting an architecture of an MVPN.

Looking at FIG. 2, then, MVPN 200 includes sites 202*a*, 202*b*, and 202*c* connected over core network 206 through a respective PE 208 (e.g., 208*a*, 208*b*, 208*c*). For example, site 202*a* is connected to other sites 202*b*, 202*c* in MVPN 200 over core network 206 through PE1 208*a*, site 202*b* is connected to other sites 202*a*, 202*c* in MVPN 200 over core network 206 through PE2 208*b* and site 202*c* is connected to other sites 202*a*, 202*b* in MVPN 200 over core network 206 through PE3 208*c*.

In MVPN 200 each site 202 may include a respective RP 218 (e.g., RP218*a*, RP218*b*, RP218*c*). Moreover, an RP 218*a* in site 202*a* including source 248*a* for a multicast group (e.g., 224.1.1.1) may be deployed at the same location as PE1 208*a* for that site 202*a*. Being deployed at the same location may include scenarios where RP1 218*a* resides on the same (virtual or physical) device as PE1 208*a* for that site 202*a*; where RP1 218*a* may reside at the same address as PE 208*a* for that site 202*a*; where PE 208*a* also acts as the RP 218*a* for that site 202*a*; or where a router may act as both the PE 208*a* and RP 218*a* for that site 202*a*. Moreover, source 248*a* for that multicast group (e.g., 224.1.1.1) may be directly connected to the PE 208*a* (e.g., and the RP218*a* deployed at the same location). For purposes of this disclosure it should be understood that a source being directly connected to an PE or RP means that there is no PIM enabled router in between (e.g., involved in routing traffic between) the source and the PE or RP.

Other sites (e.g., 202*b*, 202*c*) in MVPN 200, may include an RP (e.g., 218*b*, 218*c*) that may, or may not, be deployed at the same location as the PE (e.g., 208*b*, 208*c*) of those sites 202*b*, 202*c*. Accordingly, in MVPN 200 when a receiver (e.g., 228*b*, 228*c*) in a site (e.g., 202*b*, 202*c*) wishes to receive traffic for a multicast group having an address of 224.1.1.1, the receiver (e.g., 228*b*, 228*c*) will send a request to join multicast group 224.1.1.1. As a result of this request to join multicast group 224.1.1.1, a (*, G) tree for multicast group 224.1.1.1 will be formed or updated at the PE (208*b*, 208*c*) for that site (e.g., 202*b*, 202*c*) and a (*, G) join message for multicast group 224.1.1.1 may be sent by that PE (208*b*, 208*c*) to the closest RP in MVPN network 200. In this case, the closest RP in network 200 may be the RP (e.g., 218*b*, 218*c*) in the same site (e.g., 202*b*, 202*c*) as the receiver (e.g., 228*b*, 228*c*). For example, when receiver 228*b* sends a request to join multicast group 224.1.1.1, a (*, G) tree for multicast group 224.1.1.1 will be formed or updated at the PE2 208*b* and a (*, G) join message for multicast group 224.1.1.1 may be sent by PE2 208*b* to RP2 218*b* in site 202*b*. When RP2 218*b* receives this (*, G) join message, RP2 218*b* may register that PE2 208*b* is interested in traffic for multicast group 224.1.1.1. In a similar manner, PE3 208*c* may be registered as interested in multicast group 224.1.1.1 at RP3 218*c* in site 202*c*.

Now suppose that source 248*a* of traffic for multicast group 224.1.1.1 sends traffic for this multicast group 224.1.1.1. This traffic may be sent to RP1 218*a* in site 202*a*. In this case, however, the interest of PE2 208*b* (e.g., for receiver 228*b*) and PE3 208*c* (e.g., for receiver 228*c*) may not be registered at RP1 218*a*. This situation exists because RP1 218*a* in site 202*a* including source 248*a* for a multicast group (e.g., 224.1.1.1) is deployed at the same location as PE1 208*a* for that site 208*a*. Because of the co-located RP1 218*a* and PE1 208*a*, there was never an MVPN type 5 advertisement (e.g., source active control plane) message sent to other PEs 208*b*, 208*c* or RPs 218*b*, 218*c* in MVPN network 200 identifying source 248*a* as a source of traffic for multicast group 224.1.1.1. As such, the proper (*, G) tree was never formed at RP1 218*a* (e.g., no (*, G) join messages are ever received at RP1 218a, as these messages got terminated in the local RPs: RP2 218*b* and RP3 218*c* in local sites 202*b*, 202*c* of receivers 228*b*, 228*c*). Thus traffic from source 248*a* for multicast group 224.1.1.1 is never sent to RP2 218*b* and RP3 218*c*, receivers 228*b*, 228*c* in sites 202*b*, 202*c* never receive such multicast traffic, and no (S, G) can ever be formed between receivers 228*b*, 228*c* and source 248*a*.

To illustrate in more detail, because in the illustrated topology there is no PIM enabled router in between (e.g., involved in routing traffic between) source 248*a* and RP1 218*a*, RP1 218*a* never receives a PIM register message from such a PIM router regarding source 248*a* and therefore never sends out a type 5 advertisement message for this source 248*a* and multicast group 224.1.1.1. Moreover, as there may be only a single RP1 218*a* in site 202*a* there may be no Multicast Source Discovery Protocol (MSDP) sessions between RP1 218*a* and any other RPs in site 202*a*. Thus, RP1 218*a* is not made aware of source 248*a* for multicast group 224.1.1.1 through any MSDP sessions. As such, because a type 5 advertisement message for the source 248*a* and multicast group 224.1.1.1 is never sent out in MVPN 200 the other routers in MVPN 200 are never made aware of source 248*a* for multicast group 224.1.1.1 and the proper (*, G) trees are never formed.

Accordingly, what is needed is an ability to propagate information on an active (or inactive) source for a multicast group across an MVPN from a co-located RP and PE in the site including the active source. Embodiments may address these needs, among others, by monitoring traffic at a co-located RP and PE to determine when a directly connected source is sending (or starts sending) traffic for a multicast group. When it is determined that traffic for a multicast group is being sent from a source, a (e.g., type 5) message advertising that source for the multicast group may be sent to the MVPN. Based on this (type 5) message advertising that source for the multicast group, other RPs in the MVPN may see that advertisement message for that source for that multicast group and if an interested receiver for that group is registered at the RP that RP will join a tree including that source such that traffic from the source may be sent to that RP.

The determination that traffic for a multicast group is being sent from a source may be made, for example, by monitoring or obtaining data from the forwarding plane of a network device comprising both the RP and PE. Such monitoring can be accomplished in certain embodiments by utilizing hardware (e.g., one or more chips involved in implementing the forwarding plane at the network device) adapted to process packets and storing data related to sources and multicast groups in the hardware. This data may include, for example, data related to sources for multicast groups and counts associated with each source and multicast group (e.g., the count may include a one or more bits indicating that traffic has been received, an amount of data or number of packets received from a source for that multicast group, etc.). The data maintained by the hardware of the forwarding pipeline can thus be utilized to determine when a directly connected source is sending traffic for a multicast group. Specifically, in some embodiments, a user space process can poll the hardware for activity associated with multicast group traffic (e.g., at a regular basis) and update a user space multicast group state database (e.g., table or other data structure) comprising multicast group data.

When it is detected that traffic is being sent from a source to a multicast group, by the user space process (e.g., based on a user space multicast group state table) a type 5 message may be sent to the MVPN by the user space process. In one embodiment, this may be accomplished by a PIM agent on the network devices (e.g., a PIM agent responsible for providing PIM-SM functionality). Here, a PIM agent may perform polling of the hardware at the network device (e.g., the network device comprising both the RP and PE) and update the user space multicast group state table based on the source and multicast group data obtained from the hardware. The PIM agent can thus maintain state of source and associated multicast group flows. When a new source is detected for a multicast group based on the user space multicast group state database (or when a threshold amount of data is detected as being sent by a source for a multicast group), the PIM agent may inform (e.g., using a message or inter-process communication) a BGP agent responsible for implementing BGP at the network device that the identified source and multicast group is active. In one embodiment, the PIM agent may also update the state information associated with the identified source and multicast group in the user space multicast group state database to indicate that the BGP agent has been informed of that source and multicast group. When the BGP agent at the network device (e.g., the network device comprising both the RP and PE) receives a communication from the PIM agent indicating a source for a multicast group is active, the BGP agent can then send a type 5 message to the MVPN where that type 5 message advertises that source as a source for the identified multicast group.

Conversely, at some point a PIM agent may detect that traffic for the multicast group is no longer being received from the source. This detection may occur as a result of an analysis of the state associated with the source and multicast group in the user space multicast group state database. For example, the state may indicate traffic has not been received from that source for that multicast group for a period of time or that the state indicates a time to live for that source and multicast group has expired. When the PIM agent detects that traffic for the multicast group is no longer being received from source, the PIM agent may inform (e.g., using a message or inter-process communication) the BGP agent that the source and multicast group should be withdrawn. When the BGP agent receives such a communication from the PIM agent, the BGP may send a withdrawal message to the MVPN withdrawing that source for that multicast group.

Figure 3:
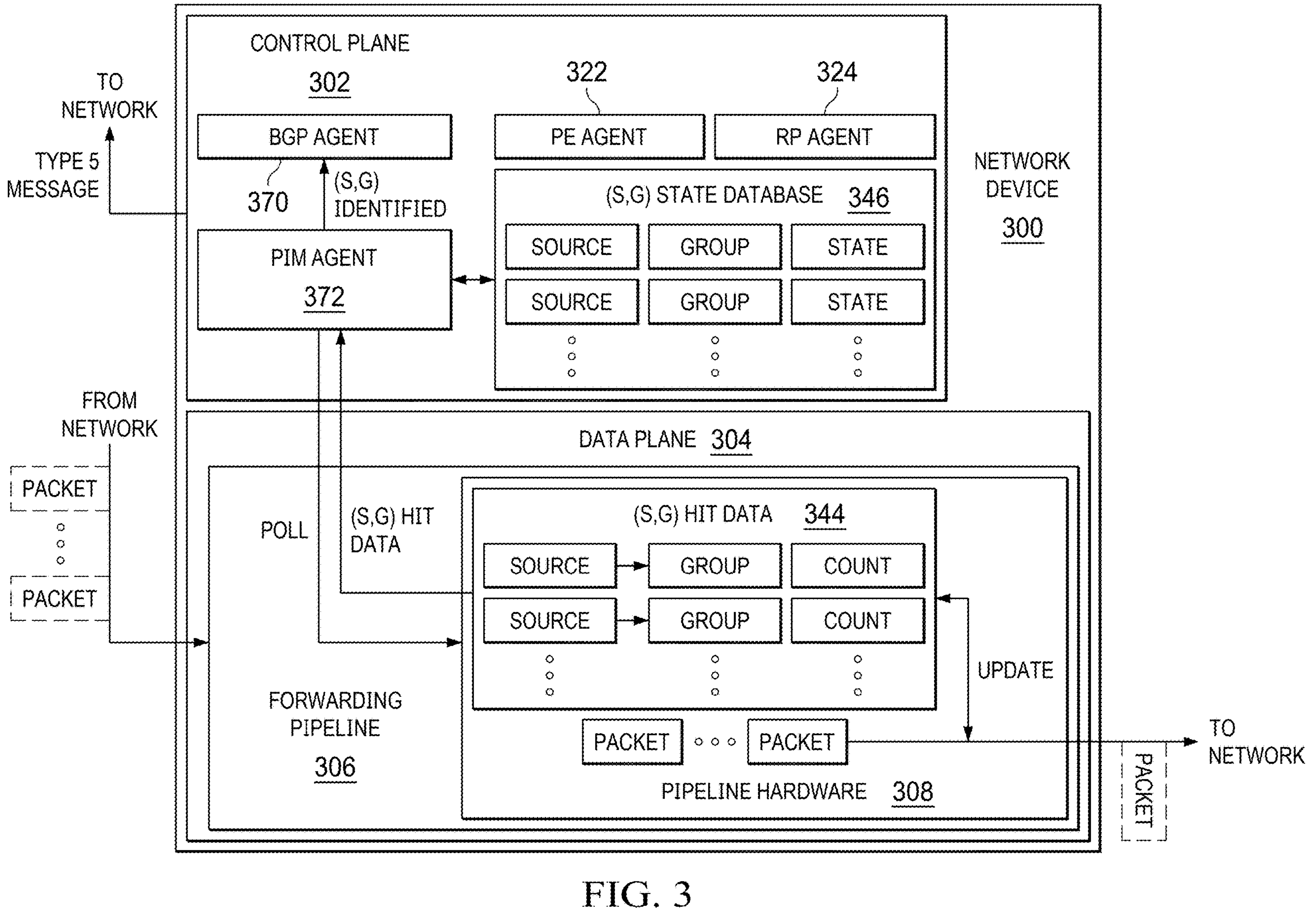
FIG. 3 is a block diagram of one embodiment of a network device adapted to generate advertisement messages for sources of multicast group traffic directly connected to a network device acting as a PE and RP in an MVPN.

FIG. 3 depicts one embodiment of a network device 300 configured to control or process network traffic. (e.g., such as a router, switch, server, etc.) that is adapted to function as a co-located RP and PE at a site in an MVPN, and propagate information on a directly connected active source for a multicast group across the MVPN. Here, network device 300 may include two different planes that are used to process network traffic: control plane 302 and data plane 304 (sometimes referred to as a forwarding plane). Control plane 302 may include a central processing unit (CPU) or the like. As network device may be adapted to be utilized as both an RP and a PE at a site in an MVPN network, a PE agent 322 adapted to implement PE functionality in an MVPN network and an RP agent 324 adapted to implement functionality in an MVPN network may execute in control plane 302 of network device. In association with network devices 300 functioning as a co-located RP and PE at a site in an MVPN, a BGP agent 370 adapted to implement BGP and a PIM agent 372 adapted to implement PIM may also execute in control plane 302 of network device 300. It will be understood that though RP agent 324, PE agent 322, BGP agent 370 and PIM agent 372 have been depicted separately for purposes of ease of description, these agents may be separate or combined according to different embodiments contemplated herein. For example, RP agent 324 may be included in PIM agent 372.

In addition to these other processes, the control plane 302 may run an operating system or other software which may be stored in memory of the network device 300. Using configuration information (e.g., such as routing information stored in forwarding tables at the network device 300), the operating system software or other software may program or access data in data plane 304. The data plane 304 receives, processes, and forwards network traffic using various configuration data (e.g., forwarding, security, quality of service (QoS), or other network traffic processing information (e.g., including that configured by the control plane 302). In particular, the data plane may implement a forwarding pipeline 306. For example, for each received packet of network traffic, the data plane 304 determines a destination address of that packet, looks up the requisite information for that destination in one or more tables stored in the data plane 304, and forwards the packet out the proper outgoing interface. Sources of this traffic may be directly connected to network device 300 in a site in which the network device 300 is deployed. As mentioned, directly connected in this context only means that a source being directly connected to an PE or RP means that there is no PIM enabled router in between (e.g., involved in routing traffic between) the source and the PE or RP.

Network device 300 may be adapted to determine that traffic for a multicast group is being sent from one of these directly connected sources and send a (e.g., type 5) message advertising that source for the multicast group to the MVPN in which it is being utilized. Specifically, data plane 304 of network device may include a packet processor or other pipeline hardware 308 (e.g., a chip, ASIC, FPGA or other circuit) utilized in the implementation of forwarding pipeline 306 adapted to implement one or more stages for forwarding a received packet by analyzing header fields of the received packet. In operation, then, network device 300 may receive packets from one or more sources on a network through ingress interfaces (e.g., ports) of network device 300 coupled to the network. These packets may be processed by data plane 304 (e.g., including the forwarding pipeline 306) to forward these packets over a corresponding egress interface (e.g., port) coupled to the network.

As these packets are processed by data plane 304, pipeline hardware 308 may store and update source group hit data 344 in pipeline hardware 308. This source group hit data 344 may, for example, include source addresses and associated destination addresses of packets received and processed by data plane. The source group hit data 344 may include (identifiers of) sources and (identifiers of) associated multicast groups for which that source is sending traffic. This source group hit data 344 may include, for example, data related to sources for multicast groups and counts associated with each source and multicast group (e.g., the count may include a one or more bits indicating that traffic has been received, an amount of data or number of packets received from a source for that multicast group, etc.). The updated source group hit data 344 maintained by the pipeline hardware of the forwarding pipeline 306 can thus be utilized to determine when a directly connected source is sending traffic for a multicast group.

Specifically, in some embodiments, a PIM agent 372 or RP agent 324 may poll pipeline hardware 308 for source group hit data 344 (e.g., at a regular set of time intervals or otherwise) and update a source group state database 346 in control plane 302 comprising multicast group data.

As one embodiment, PIM agent 372 may also determine when a source is sending traffic for a multicast group based on an explicit message mechanism from pipeline hardware 308. In this embodiment, PIM agent 372 may register a callback mechanism with the operating system or other software agents in control plane 302 that may be involved with forwarding traffic for a source to a multicast group (e.g., (S, G) traffic or shared tree (*, G) traffic), including those used in software forwarding when a new (S, G) flow is detected. This registered callback mechanism is adapted to allow the PIM agent 372 to be informed when the operating system (or other software agent) receives traffic for forwarding for a (e.g., new) (S, G) flow from pipeline hardware 308, or is informed of such a new flow from pipeline hardware 308.

In particular, in some embodiments, whenever pipeline hardware 308 determines a new flow (e.g., a new (S, G) flow such as an (S, G) flow for which there is no hardware forwarding entry in pipeline hardware 308)), pipeline hardware 308 may send traffic for that flow (e.g., a packet) to the operating system (or other software agent) in control plane 302 of network device 300 to forward that traffic (referred to as software forwarding). The PIM agent 372 is thus informed of this new (S, G,) flow through the callback mechanism is previously registered with the operating system (or other software agent). Upon being informed of this new source through the callback mechanism, PIM agent 372 may periodically poll pipeline hardware 308 to determine if that source is active (e.g., based on source group hit data 344) and update source group state database 346 in control plane 302 comprising multicast group data.

This source group state database 346 may include a set of (e.g., directly connected) sources and an associated multicast group for each source, where that source is a source of traffic for that multicast group. The source group state database 346 may also include a state associated with each source and associated multicast group. This state may include data such as a count (e.g., amount of data that has been received, a number of packets that have been received from the source for that multicast group, etc., whether that source is currently active or inactive, whether an advertisement message has been sent for that source and multicast group, or other desired data).

PIM agent 372 or RP agent 324 may utilize data in source group state database 346 to determine when a new (e.g., directly connected) source is determined for a multicast group. This may be determined, for example, when a new source and associated multicast group is included in source group state database 346 or based on state data associated with a source and multicast group indicates a threshold amount of data or communications have been sent by that source to the multicast group. That threshold can, for example, be a single data packet received from a new source or may be a greater amount of data or a certain packet count.

When PIM agent 372 or RP agent 324 detects a new (directly coupled) source for a multicast group based on the source group state database 346 (e.g., when a new source is associated with a multicast group or when a threshold amount of data is detected as being sent by a source for a multicast group), PIM agent 372 may inform (e.g., using a message or inter-process communication) BGP agent 370 at network device 300 that the identified source and multicast group is active or a new source has otherwise been identified. For example, if RP agent 324 detects a new source for a multicast group it may notify PIM agent 372 that a new source for a multicast group has been determined and identify that source and multicast group. In one embodiment, PIM agent 372 or RP agent 324 may also update the state information associated with the identified source and multicast group in source group state database 346 to indicate that the BGP agent 370 has been informed of that source and multicast group.

When the BGP agent 370 at the network device 300 receives a communication from PIM agent 372 identifying a source for a multicast group, BGP agent 370 can send a type 5 message to the MVPN where that type 5 message advertises the identified source as a source for the identified multicast group. BGP is utilized to send such an advertisement message on MVPN.

PIM agent 372 or RP agent 324 may also utilize source group state database 346 to determine that traffic for a multicast group is no longer being received from a particular (e.g., directly coupled) source. This determination may occur as a result of an analysis of a state associated with the source and multicast group in source group state database 346. For example, the state may indicate traffic has not been received from that source for that multicast group for a period of time, that an amount of data or packets that is less than a threshold amount has been received in the period of time, or the state may indicate a time to live for that source and multicast group has expired. This period of time or threshold (e.g., a period of inactivity) may be, for example, between 100 and 300 seconds and may be configurable. When PIM agent 372 or RP agent 324 determines that traffic for a multicast group is no longer being received from a source, PIM agent 372 may inform (e.g., using a message or inter-process communication) BGP agent 370 that an identified source and multicast group should be withdrawn. When the BGP agent 370 receives such a communication from PIM agent 372, BGP agent 370 may send a withdrawal message to the MVPN withdrawing that source for that multicast group.

Figure 4:
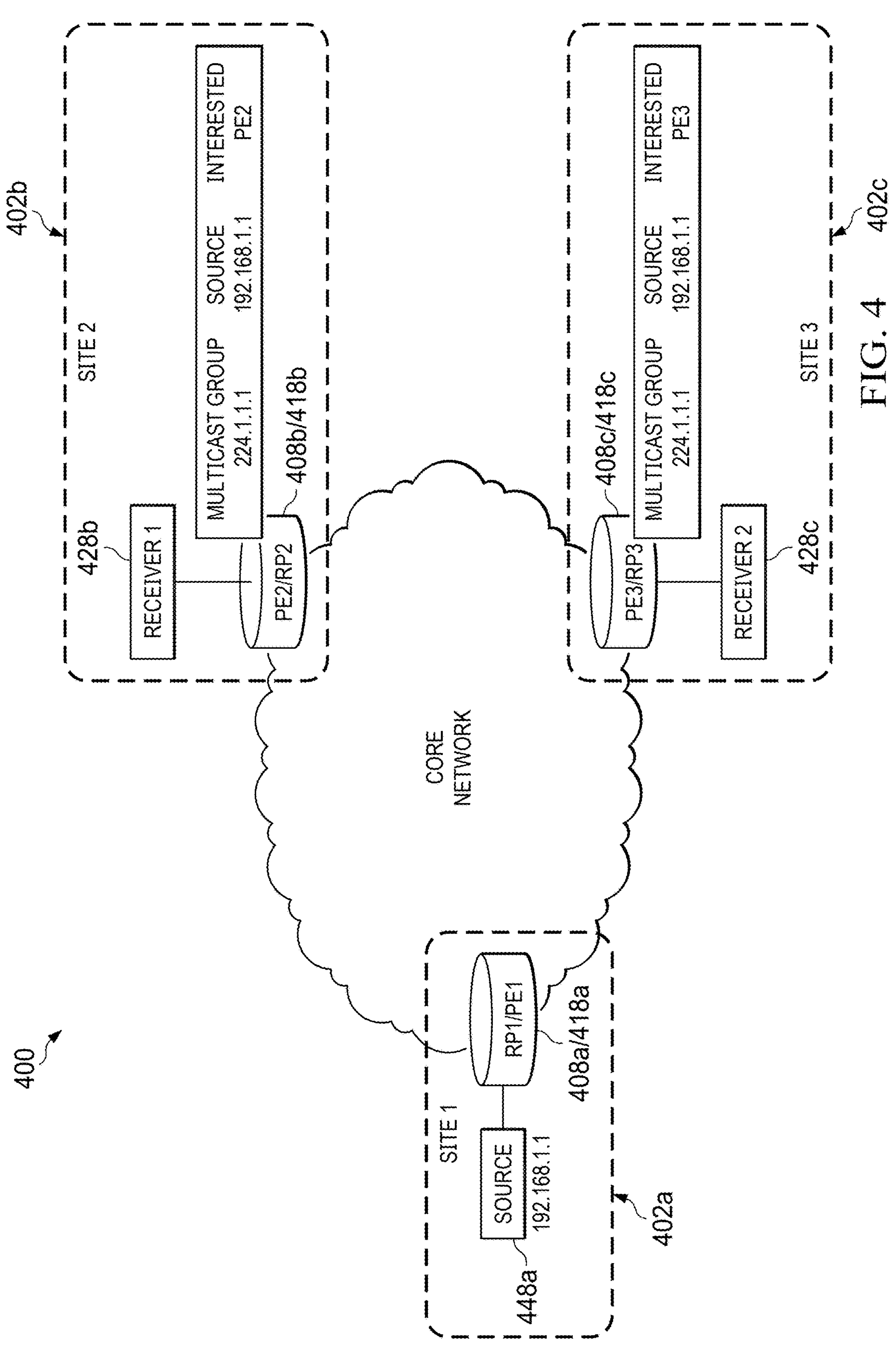
FIG. 4 is a block diagram depicting an architecture of an MVPN including one embodiment of a network device adapted to act as a PE and RP in an MVPN and generate advertisement messages for sources of multicast group traffic directly connected to the network device.

Referring briefly to FIG. 4, a network topology for an MVPN 400 similar to FIG. 2 is depicted. In the MVPN 400 of FIG. 4, however, while RP1 418*a* in site 402*a* including source 448*a* for a multicast group (e.g., 224.1.1.1) is deployed at the same location as PE1 408*a* for that site 402*a*, RP1 418*a* and PE1 408*a* may be deployed on an embodiment of a network device adapted to propagate information on a directly connected active source for a multicast group across the MVPN as disclosed. Thus, in MVPN 400 when a receiver (e.g., 428*b*, 428*c*) in a site (e.g., 402*b*, 402*c*) wishes to receive traffic for a multicast group having an address of 224.1.1.1, the receiver (e.g., 428*b*, 428*c*) will send a request to join multicast group 224.1.1.1.

As a result of this request to join multicast group 224.1.1.1, a (*, G) tree for multicast group 224.1.1.1 will be formed or updated at the PE (408*b*, 408*c*) for that site (e.g., 402*b*, 402*c*) and a (*, G) join message for multicast group 224.1.1.1 may be sent by that PE (408*b*, 408*c*) to the closest RP in MVPN network 400. In this case, the closest RP in network 400 may be the RP (e.g., 418*b*, 418*c*) in the same site (e.g., 402*b*, 402*c*) as the receiver (e.g., 428*b*, 428*c*). For example, when receiver 428*b* sends a request to join multicast group 224.1.1.1a (*, G) tree for multicast group 224.1.1.1 will be formed or updated at the PE2 408*b* and a (*, G) join message for multicast group 224.1.1.1 may be sent by PE2 408*b* to RP2 418*b* in site 402*b*. When RP2 418*b* receives this (*, G) join message, RP2 418*b* may register that PE2 408*b* is interested in traffic for multicast group 224.1.1.1. In a similar manner, PE3 408*c* may be registered as interested in multicast group 224.1.1.1 at RP3 418*c* in site 402*c*.

Now suppose that source 448*a* 192.168.1.1 of traffic for multicast group 224.1.1.1 sends traffic for this multicast group 224.1.1.1. Because RP1 418*a* and PE1 408*a* are deployed on an embodiment of a network device adapted to propagate information on a directly connected active source for a multicast group across MVPN 400, when source 448*a* 192.168.1.1 is detected as a new source for multicast group 224.1.1.1, a type 5 advertisement message (e.g., an MVPN type 5 control plane message such as a source active message) advertising source 448*a* as a source of traffic for multicast group 224.1.1.1 may be sent to MVPN 400, where it is received by RP2 418*b* and RP3 418*c*.

Accordingly, based on receiving this type 5 advertising message for source 448*a* 192.168.1.1 and multicast group 224.1.1.1, RP2 418*b* and RP3 418*c* may register source 448*a* 192.168.1.1 as a source for multicast group 224.1.1.1. RP2 418*b* and RP3 418*c* can thus join the (*, G) tree for that multicast group (e.g., at PE3 408*a*) such that traffic from source 448*a* 192.168.1 for multicast group 224.1.1.1 may be sent to both RP2 418*b* and RP3 418*c*, and RP2 418*b* and RP3 418*c* can send this traffic to their respective registered receivers for multicast group 224.1.1.1 (e.g., in this case receivers 428*b* and 428*c*). At some point later then, an (S, G) tree may be formed to that source 448*a* according to operation of MVPN 400 as would be understood by one or ordinary skill in the art.

Figure 5:
FIG. 5 is a flow diagram of one embodiment of a method for generating advertisement messages for sources of multicast group traffic directly connected to a network device acting as a PE and RP in an MVPN.

FIG. 5 depicts one embodiment of a method that may be utilized by a network device to propagate information on a directly connected active source for a multicast group across an MVPN when that network device is functioning as both an RP and PE at a site in an MVPN. When the network device is functioning in this manner, data on sources for multicast groups may be determined by hardware at the network device (STEP 502). Specifically, as packets are processed in the data plane of the network device, packet processing hardware at the network device (e.g., hardware implementing a forwarding pipeline) may store and update source group hit data. The source group hit data may include addresses and destinations determined from packets processed by the network device (e.g., in the forwarding pipeline) such that this data includes the sources and associated multicast groups for which that source is sending traffic.

At some interval or time, a process in the control plane of the network device may obtain (at least a portion of) the source group hit data maintained by the hardware at the network device (STEP 504). The obtained source group hit data can be used to update a source group state database in the control plane of the network device (STEP 506). This source group state database may include a set of (e.g., directly connected) sources and an associated multicast group for each source, where that source is a source of traffic for that multicast group. The source group state database may also include a state associated with each source and associated multicast group.

Based on the data in the source group state database it can be determined if a new (e.g., directly connected) source is determined for a multicast group (STEP 508). Such a determination can be made, for example, when a new source and associated multicast group is included in the source group state database or based on state data associated with a source and multicast group indicates a threshold amount of data or communications have been sent by that source to the multicast group.

When a new (directly coupled) source for a multicast group is determined based on the source group state database (Y Branch of STEP 508), a type 5 message may be sent to the MVPN where that type 5 message advertises the identified source as a source for the identified multicast group (STEP 510). Additionally, based on the data in source group state database, it can be determined that traffic for a multicast group is no longer being received from a particular (e.g., directly coupled) source (i.e., that source is no longer active for that multicast group) (STEP 512). When it is determined that traffic for a multicast group is no longer being received from a source at the network device (Y Branch of STEP 512) a withdrawal message may be sent to the MVPN withdrawing that source for that multicast group (STEP 514).

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method, comprising:

determining, at a network device acting as both an Rendezvous Point (RP) and a Provider Edge (PE) router at a site in a Multicast Virtual Private Network (MVPN), that a source is active for a multicast group; and sending an advertisement message to the MVPN in response to the determination that the source is active for the multicast group, the advertisement message indicating the source and the multicast group.

2. The method of claim 1, wherein the advertisement message is a type 5 source active message.

3. The method of claim 1, wherein the source is directly connected to the network device.

4. The method of claim 1, wherein determining that the source is active for the multicast group is based on source group hit data determined from packets processed by the network device.

5. The method of claim 4, wherein the source group hit data comprises first source group hit data obtained from packet processing hardware at the network device at a first time or second source group hit data obtained from the packet processing hardware at a second time.

6. The method of claim 5, further comprising:

determining that the source is no longer active for the multicast group based on source group hit data; and sending out a withdrawal message identifying the source and the multicast group.

7. The method of claim 6, wherein the second source group hit data is the same as the first source group hit data.

8. The method of claim 1, wherein the source is in the site and the advertisement message is sent to a second PE at a second site.

9. A network device, comprising:

a processor;

packet processing hardware adapted to determine source group hit data based on packets processed by the packet processing hardware at the network device;

a non-transitory computer readable medium, comprising instructions executable on the processor to:

implement a Rendezvous Point (RP) and a Provider Edge (PE) router for a site in a Multicast Virtual Private Network (MVPN);

obtain source group hit data from the packet processing hardware;

determine that a first directly connected source is active for a multicast group based on obtained source group hit data; and send an advertisement message to the MVPN in response to the determination that the first directly connected source is active for the multicast group, the advertisement message indicating the first directly connected source and the multicast group.

10. The network device of claim 9, wherein obtaining source group hit data comprises polling the packet processing hardware at a time interval.

11. The network device of claim 9, wherein obtaining source group hit data is based on a communication received from the packet processing hardware.

12. The network device of claim 9, wherein the instructions are further executable to:

determine that a second directly connected source is no longer active for the multicast group based on obtained source group hit data; and sending out a withdrawal message identifying the second directly connected source and the multicast group.

13. The network device of claim 12, wherein the second directly connected source is different from the first directly connected source, the RP is the only RP associated with the site, and the PE is the only PE associated with the site.

14. The network device of claim 9, wherein the first directly connected source is in the site and the advertisement message is sent to a second PE at a second site.

15. A non-transitory computer readable medium, comprising instructions for:

obtaining source group hit data from packet processing hardware at a network device acting as both an Rendezvous Point (RP) and a Provider Edge (PE) router at a site in a Multicast Virtual Private Network (MVPN);

determining, based on obtained first source group hit data, that a first source is active for a first multicast group, wherein the first source is directly connected to the network device; and sending an advertisement message to the MVPN in response to the determination that the first source is active for the first multicast group, wherein the advertisement message indicates the first source and the first multicast group.

16. The non-transitory computer readable medium of claim 15, wherein the instructions are further for:

determining that a second source is no longer active for a second multicast group based on obtained second source group hit data; and sending out a withdrawal message identifying the second source and the second multicast group.

17. The non-transitory computer readable medium of claim 15, wherein the second source is different from the first source.

18. The non-transitory computer readable medium of claim 17, wherein the second multicast group is different from the first multicast group.

19. The non-transitory computer readable medium of claim 18, wherein the second source group hit data is the same as the first source group hit data.

20. The non-transitory computer readable medium of claim 15, wherein the first source is in the site and the advertisement message is sent to a second PE at a second site.

* * * * *